June 23, 1964  J. CADIOU  3,138,067
REGULATOR DEVICE FOR HYDRAULIC MOTORS
Filed July 5, 1961  2 Sheets-Sheet 1

INVENTOR
JEAN CADIOU
By Wenderoth, Lind & Ponack
ATTORNEYS

United States Patent Office 3,138,067
Patented June 23, 1964

3,138,067
REGULATOR DEVICE FOR HYDRAULIC MOTORS
Jean Cadiou, Paris, France, assignor to Societe Anonyme
Andre Citroen, Paris, France, a corporation of France
Filed July 5, 1961, Ser. No. 121,914
Claims priority, application France July 8, 1960
4 Claims. (Cl. 91—175)

The present invention relates to regulator devices for hydraulic motors of the barrel type with an oscillating plate. Regulator devices adapted to this type of motor have already been described in the French patent application No. 1,269,749, filed on July 6, 1960, corresponding to U.S. Serial No. 121,915, filed July 5, 1961, by the present applicant, for "A Method of and Apparatus for the Regulation of Hydraulic Motors."

The device described in this latter application, in certain of its forms of construction, utilizes the high control pressure of the motor (admission) to incline the driving plate of the latter, while the low pressure (exhaust) is used to permit the return of the plate to a non-inclined position under the action of a return spring.

The driving plate is actuated by a piston, the connection of which to the high or low pressure system is affected by a slide-valve distributor which is displaced by the effect of a pressure-drop affecting the low pressure.

The present invention has for its object a regulator device of this type, characterized in that the whole of the output of the motor to be regulated is employed, but with a very small drop in pressure which can therefore be taken from the exhaust, by virtue of the amplification of force obtained by causing the low pressure to act on a moving member having an appropriate surface area.

There is thus obtained the force required for the control of the regulating distributor, whereas in the known devices, high-pressure fluid is generally tapped-off to actuate the distributor directly with the result that there is a permanent loss of fluid which is wholly withdrawn from the operation of the motor.

To this end, the regulator device in accordance with the invention comprises two chambers variable by displacement of walls which in turn displace the slide-valve of the said distributor, the said displacement resulting from the creation of a difference in pressure between the two chambers under the action of members controlled by the input quantity of the regulator.

The said members preferably comprise two exhausts respectively opening into the two chambers and controlled by the position of a moving member under the action of the said input quantity.

When the input quantity is zero, the two chambers are subjected to the same pressure slightly lower than the low pressure, maintained at a constant low level, of the hydraulic control circuit of the motor.

The variations of the input quantity create a difference in exhaust and therefore of pressure inside the two chambers and for this reason, result in a displacement of the distributor slide-valve which controls the regulator piston, without affecting the low pressure.

The invention will be better understood with reference to the description which follows and to the accompanying drawings, in which the same reference numbers have been giving to similar part, and in which.

Figure 1:
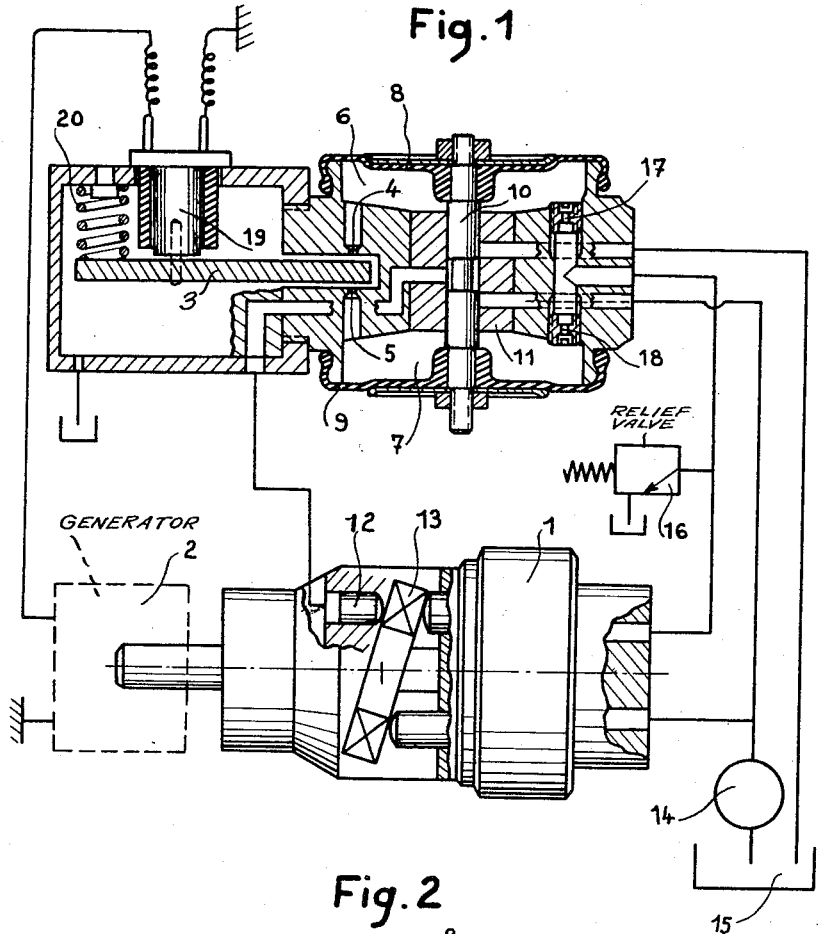
FIG. 1 shows diagrammatically a regulator unit in accordance with one form of construction of the invention, in which the control of the exhaust from the chambers by the input quantity is electro-magnetic.

The regulator shown in the drawing is intended for the control for example of the output or of the speed of a hydraulic motor 1 coupled to an electric generator 2.

The voltage, or the current, or any other parameter of operation of this generator, controls, by means which will be described below, the displacement of a member 3 between two exhausts 4 and 5 respectively, opening into two chambers 6 and 7. These chambers are de-limited by moving walls 8 and 9, such as for example diaphragms (FIGS. 1 and 3), pistons (FIG. 2) or the like.

These movable walls are rigidly coupled to the slide-valve 10 of a hydraulic distributor 11. This slide-valve couples the piston 12 which regulates the inclination of the driving plate 13, either to the high pressure 14 or to the low pressure 15 of the hydraulic control circuit of the motor.

The exhaust of the motor is furthermore coupled to the chambers 6 and 7 through the intermediary of a valve 16 calibrated to a constant low level, and of two nozzles 17 and 18 respectively. When the member 3 is equi-distant from the exhausts 4 and 5, the pressure is identical in the chambers 6 and 7 and is slightly less than the adjusted pressure of the valve 16.

The displacement of the member 3 under the control of the input quantity of the regulator (current, voltage or other parameter) results in the establishment of a difference of pressure between the two chambers and therefore in an appropriate displacement of the slide-valve 10.

Figure 2:
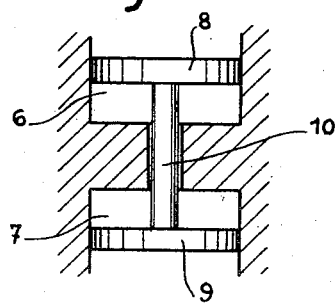
FIG. 2 shows an alternative form of construction of the chambers.

In the form of construction show in FIG. 1, the displacement of the member 3 is controlled by an electro-magnet 19, acting in opposition to a spring 20, the electro-magnet being excited from the output of the generator.

Figure 3:
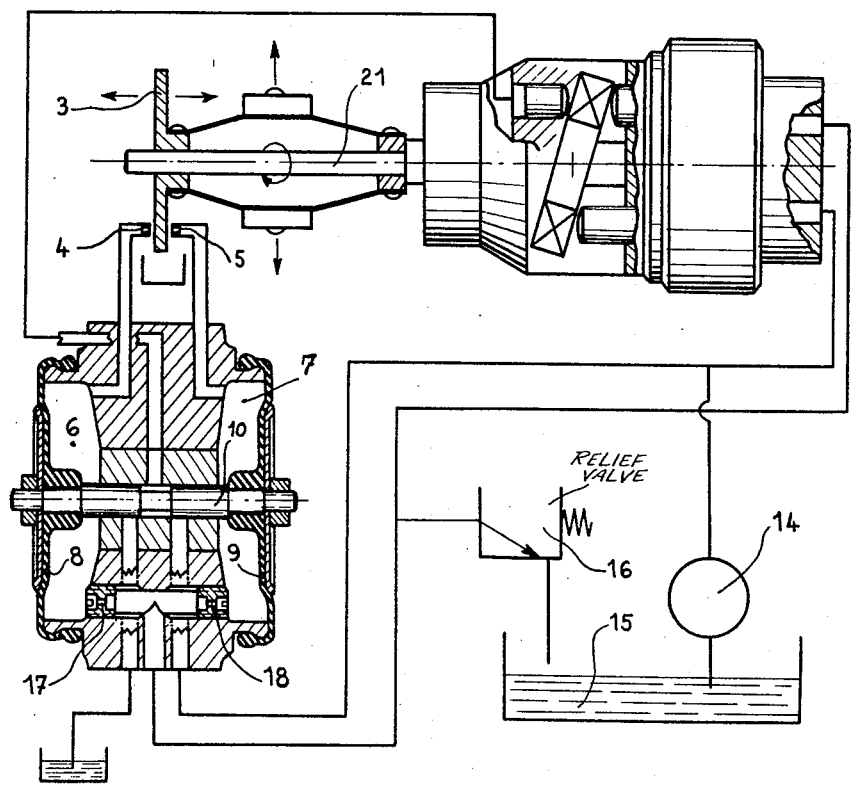
FIG. 3 is a diagram of a further form of embodiment, in which the control of the exhaust of the chamber is effected by means of a centrifugal regulator.

In the alternative form shown in FIG. 3, this displacement is controlled by a centrifugal regulator 21, keyed directly on the shaft of the motor, the speed of which is to be regulated. The member 3 forms an integral part of this regulator, which may be of known type.

The means permitting the control of the displacement of an element such as the element 3 by means of a variable parameter such as the voltage or amperage of a current or the speed of rotation of a shaft are well known by workers in this art. There are numerous examples and only two examples need to be mentioned, the first shown in FIGURE 1 according to which the amperage of the current of the generator brings about an excitation of an electromagnet and consequently the displacement of a core while in the other as shown in FIGURE 3 the speed of the shaft acts upon the centrifugal system.

In the first case a current whose amperage is proportional to that of the exit current of the generator for example, a branch thereon through the intermediary of a strong resistance traverses the winding of the electromagnet. The field proportional to such amperage brings about a force of attraction upon the core which is opposed to the force of the spring 20 and the piece 3 rises upon the core by means of a yoke.

Therefore when the amperage increases the core 19 raises the piece 3 and this closes the exhaust 4, the pressure increases slightly in the corresponding capacity 6, the nozzle 17 bringing about in its turn a fall of pressure between the exhaust of the motor and the atmosphere. The slide valve 10 then rises, placing the capacity of the piston 12 in communication with low pressure, the plate 13 straightens which diminishes as is well known, the power of the motor 1 of the barrel type.

It is understood that when the slide valve 10 is displaced under the effect of a modification of the intensity of the generator (or of the speed of rotation or any other parameter) which determines an exhaust as a function of the element 3, the cylinder containing the piston 12 is connected as indicated either to the high pressure 14 or the low pressure 15 of the hydraulic control circuit of the motor according to the variation direction of the parameter.

Supporting that the connection has been made with the low pressure the piston 12 returns towards the rear (towards the left in FIGURE 1) under the action of the plate 13 whose inclination controls the amplitude of the displacement of the pistons of the motor 1 which serve as a support abutment, it results therefor that the plate 13 is righted bringing about a diminution of the amplitude of the travel of the pistons of the motor 1, and in consequence develops a smaller power. At this moment the element 3 under the action of the parameter considered resumes its first position, the slide valve 10 closes communication with the low pressure, and there results a new state of equilibrium of the operation of the motor 1, at a developed power less than the preceding.

The operation is similar in the case where the slide valve 3 is displaced in such a manner as to connect the cylinder of piston 12 with the high pressure.

It will of course be understood that the devices described above by way of examples only may form the subject of numerous alternative forms of construction.

What is claimed is:

1. Device for the regulation of the speed, the output or other operating characteristics of a hydraulic motor of the barrel type comprising a driving plate having a variable inclination, a slide valve distributor, a piston alternatively coupled by said slide-valve distributor to the high pressure and to the low pressure sides of the hydraulic control circuit of the motor and acting on the driving plate, two chambers having each a movable wall and communicating by throttle valves with the exhaust circuit of the motor, said movable walls being opposed and rigid with said slide valve regulator, a moving member controlling the exhausts of said chambers, and means responsive to the variation of an input quantity depending upon the rotation of said motor for moving said moving member.

2. A regulating device in accordance with claim 1, in which said moving member is actuated by an electromagnet operated by the output of an electric generator driven by said motor.

3. A regulating device in accordance with claim 1, in which said moving member forms part of a centrifugal regulator driven by said motor.

4. A regulating device in accordance with claim 1, in which when said input quantity is zero, said two chambers being under the same pressure slightly less than the low pressure of the hydraulic control circuit of said motor.

References Cited in the file of this patent

UNITED STATES PATENTS

| | | |
|---|---|---|
| 1,785,355 | Lawser | Dec. 16, 1930 |
| 2,146,117 | Gros | Feb. 7, 1939 |
| 2,674,191 | Ifield | Apr. 6, 1954 |
| 2,683,485 | Harris | July 13, 1954 |
| 2,803,112 | Sadler et al. | Aug. 20, 1957 |
| 2,860,517 | Cauble | Nov. 18, 1959 |
| 2,878,832 | Hogl | Mar. 24, 1959 |
| 2,915,985 | Budzich | Dec. 8, 1959 |
| 3,033,047 | Uchida | May 8, 1962 |
| 3,033,232 | Bahniuk | May 8, 1962 |